Sept. 20, 1971  H. T. COBEY  3,606,265
FRAGMENTIZING APPARATUS WITH VERTICALLY MOUNTED DRUM
Filed April 3, 1969  3 Sheets-Sheet 2

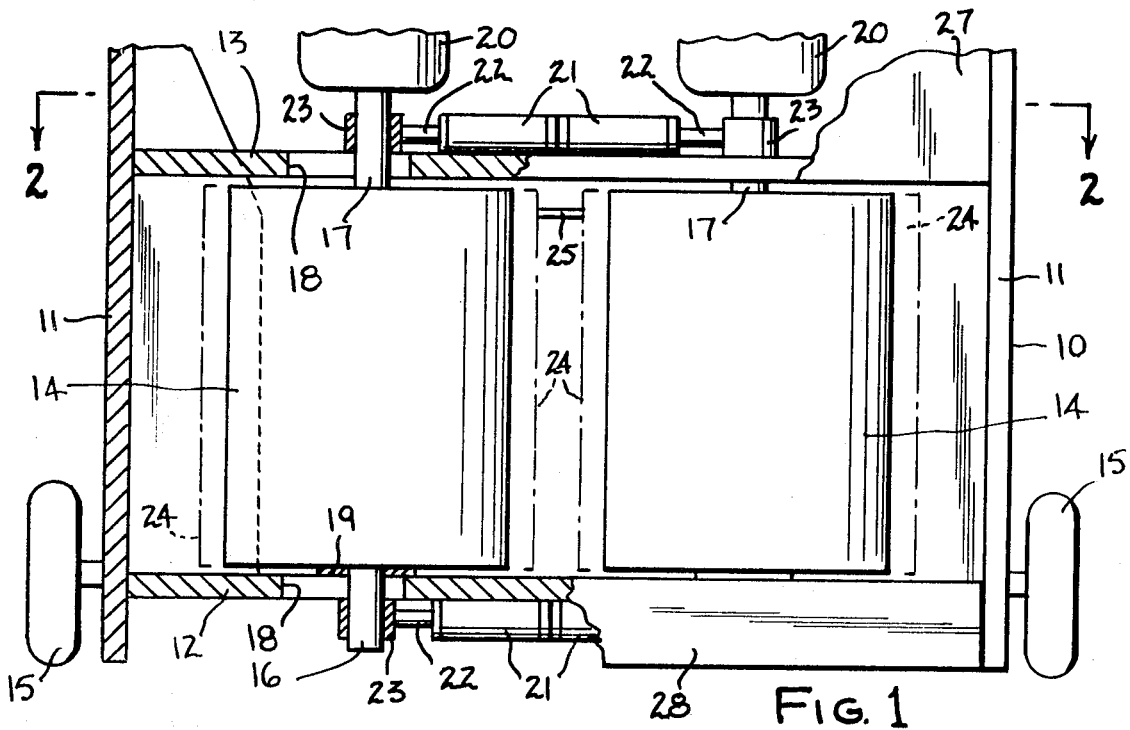
FIG. 1
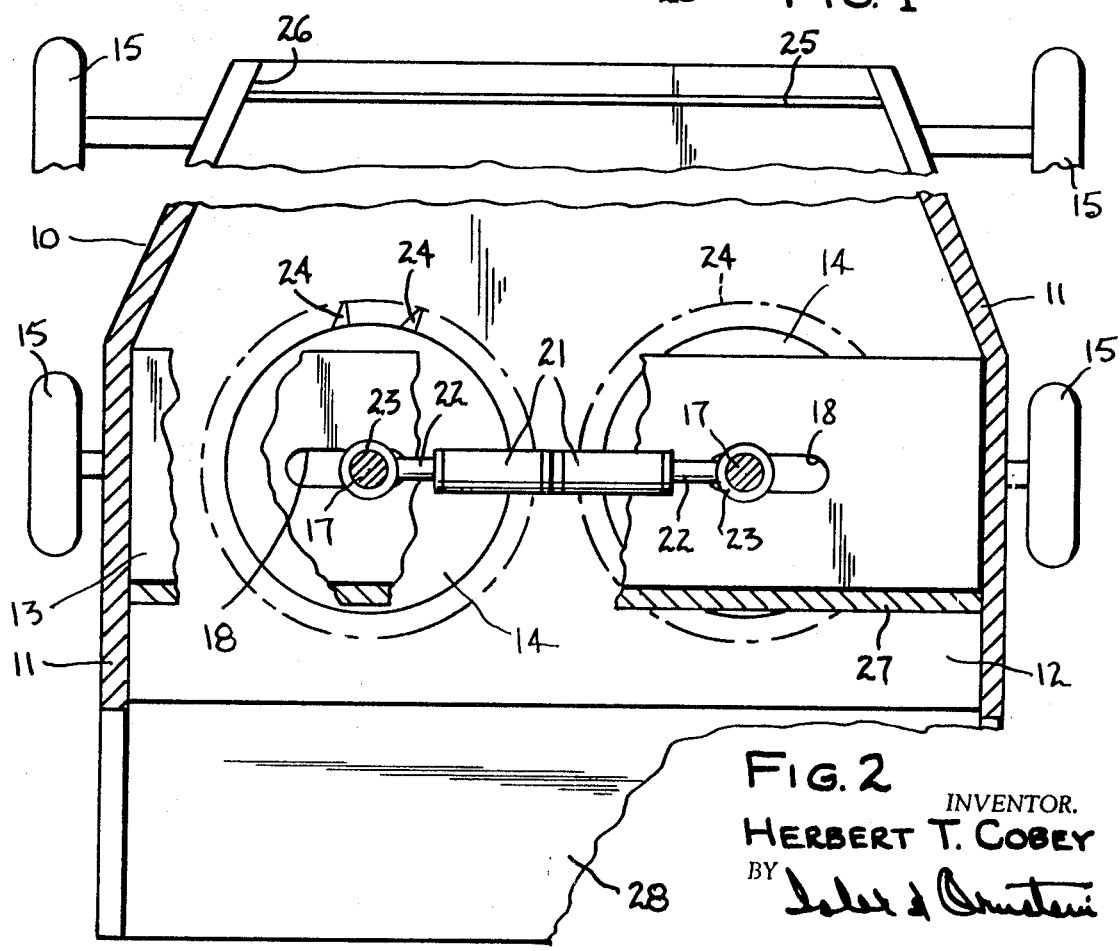
FIG. 2
INVENTOR.
HERBERT T. COBEY
BY
ATTORNEYS.

INVENTOR.
HERBERT T. COBEY
BY
ATTORNEYS.

United States Patent Office 3,606,265
Patented Sept. 20, 1971

3,606,265
FRAGMENTIZING APPARATUS WITH VERTICALLY MOUNTED DRUM
Herbert T. Cobey, R.F.D. 2,
Galion, Ohio 44833
Filed Apr. 3, 1969, Ser. No. 813,011
Int. Cl. B01f 7/16, 15/02; B02c 2/04
U.S. Cl. 259—8
13 Claims

ABSTRACT OF THE DISCLOSURE

A stationary or mobile fragmentizing apparatus provided with one or more rotors or drums mounted for rotation about a vertical axis and having impact or shearing projections thereon for fragmentizing agricultural or waste materials which are fed to the apparatus. Means are provided for adjusting the spacing between adjacent drums for fragmentization control as well as for providing temporary clearance for the passage of an injurious obstruction. Such drum separating or spacing means can be made load responsive. For convenient and inexpensive replacement of the individual impact projections, a continuous bracket formed by a helix of angle iron is secured to the drum and serves as a mounting plate for the impact projections.

BACKGROUND OF THE INVENTION

The invention is directed primarily to the field of solid waste disposal, including the field of agricultural waste disposal. In the field of agricultural wastes, the high organic content lends itself to composting processes which transform the waste from an obnoxious and undesired material to a valuable and salable by-product, if the composting can be done at sufficiently low cost to bring the price of the compost within reach of those who can utilize it.

In the field of solid waste disposal generally, such as municipal refuse, there is also a high organic content of the waste material which lends itself to composting under the same circumstances as mentioned above. This not only provides a means of meeting the problem of disposing of the waste but, again, also serves as a means for converting the waste to a less obnoxious form which, with appropriate economies of production, can find a ready market as a plant nutrient. Even if the solid waste, such as municipal refuse, is not converted into compost or some other salable by-product, there is still considerable advantage in fragmentizing the waste material either for purposes of digesting the wastes, incinerating the wastes more economically, or for better compaction of the waste, such as in a land fill operation.

Various means and devices have been proposed and utilized for effecting composting or effecting fragmentization. Most of these involve complex waste disposal installations having a very high initial cost and an equally high operating cost. More recently, the problem of waste disposal has been more satisfactorily resolved with higher productivity and lower initial and operating costs through the use of rotating drum fragmentizing apparatus of the self-propelled type, as disclosed for example in my U.S. Patent No. 3,369,797 entitled Compost Turner and Windrow Forming Machine. This patent discloses a toothed drum mounted for rotation about a horizontally disposed axis. The mass or mound of waste material which can be satisfactorily processed by the horizontal drum apparatus can have a height no greater than the approximate diameter of the drum. For practical purposes and from the standpoint of manufacturing cost, such horizontal drums are ordinarily limited in diameter to between 3 feet and 6 feet. Further, it has been found that the processing of municipal refuse often involves encounter with large, heavy objects which can cause severe injury to the teeth of the drum or to the drum itself, because no convenient means are provided for permitting such an obstruction or heavy object to pass through the apparatus without engaging the revolving drum.

SUMMARY OF THE INVENTION

The present invention relates to a stationary or mobile apparatus having a drum or drums which are mounted for rotation about a vertical axis and which can, within practical limits, be made of any required length so that the apparatus is not limited to handling a mass of material whose height is only as great as the diameter of the fragmentizing drum.

The invention also provides quick and convenient means for separating the drums so as to provide a clearance area therebetween of sufficient size to pass an obstruction that is noted by the operator of the apparatus. The means for causing such separation of the drums can be under the control of the operator and can also serve as a means for establishing the operating spacing of the fragmentizing drums from each other so that the interaction of such spaced drums will produce a coarser or finer degree of fragmentization.

The separating means can also be made load-responsive so that automatic spacing of the drums will result as a consequence of changes in the density of the material being treated. The load-responsive separating actuation of the drums will also serve to pass a large obstruction through the apparatus by permitting the drums to yield to the passage of such an object.

The invention also contemplates the improved mounting means for the teeth or other impact projections of the drum, in the form of an angle bracket secured to the drum, which not only serves as a strengthening rib for the drum but also provides a mounting surface for easy attachment of the teeth or groups of teeth to the drum when replacement becomes necessary.

BRIEF DESCRIPTION OF THE DRAWING

FIG. 1 is a view in front elevation of a fragmentizing apparatus embodying the features of my invention, portions thereof being broken away for clarity of disclosure.

FIG. 2 is a fragmentary cross-sectional view, taken as indicated on line 2—2 of FIG. 1.

DESCRIPTION OF THE PREFERRED EMBODIMENTS

Figure 3:
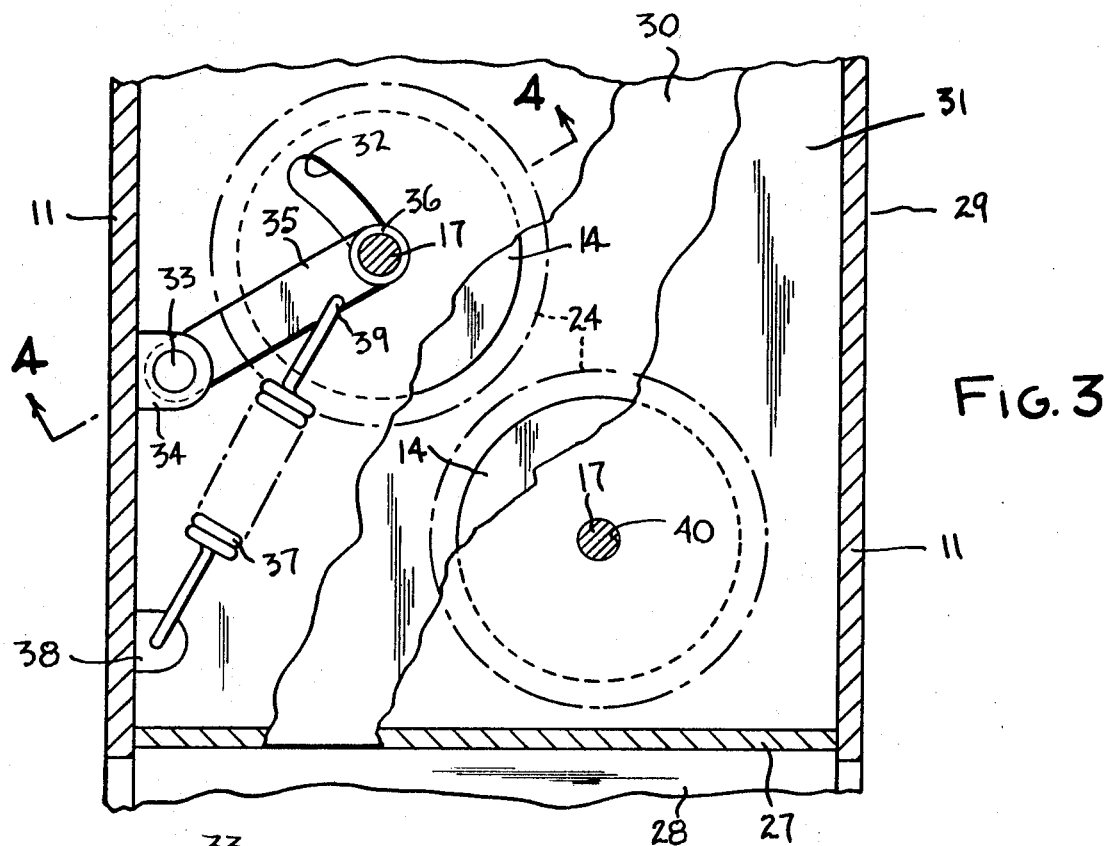
FIG. 3 is a fragmentary sectional view, similar to FIG. 2, but showing a modified form of the invention.

Referring more particularly to FIGS. 1 and 2 of the drawings, I have shown a fragmentizing apparatus, generally designated by the reference numeral 10 having a frame, which includes spaced side walls 11 which are suitably interconnected by a cross member or floor plate 12 and by another cross member or top plate 13, which is vertically spaced above the member 12 a sufficient distance to accommodate the length of the drum or drums 14 which are mounted therebetween.

The apparatus 10 is shown as having wheels 15 and these wheels may be powered by any suitable means so that the apparatus can be self-propelled and may also be provided with an suitable or desired steering mechanism, as is well known to the art. If the wheels 15 are not powered, the apparatus is still mobile and may be pulled as a trailer, either for operating purposes or for portable transport from one operating location to another.

When the apparatus is self-propelled or mobile in operation, waste material is fed to the apparatus by the relative movement of the apparatus with respect to the waste material being processed. However, it is to be understood that the apparatus herein described need not necessarily be mobile but can be utilized as a stationary installation with the waste material being brought to it by any suitable means, such as, hopper feed, conveyor feed or dump truck feed.

Under most conditions of use, the productivity and efficiency of operation of the fragmentizing apparatus is enhanced by the use of at least two drums 14 in combination, in the manner shown in the drawings. However, there are and may be special circumstances where the utilization of only a single drum is sufficient or desirable for the purposes intended. It is to be understood that, although the description and illustration of the embodiments of the invention disclose the more common use of at least two drums in combination, the principles of my invention can be utilized when only a single drum is used and my invention contemplates such single drum use.

Each of the drums 14 is provided with a downwardly extending axle stub 16 and an upwardly extending axle stub 17 which are journalled for rotation in the lower cross member 12 and the upper cross member 13 respectively, by means of the elongated bearing slots 18 which are disposed in vertical alignment in the respective cross members. It will be understood that the illustrated form of journalling of the axle stubs 16 and 17 may be augmented by the use of any known forms of anti-friction devices, as is well known in the art. Each of the drums 14 is suitably supported for rotation in any desired manner, here shown as a thrust bearing 19 engaging the lower cross member 12.

Motive power for effecting the rotation of the drums can be provided by any suitable means, here shown as an electrical motor 20 secured to the upper axle stub 17 and so mounted as to be free to move bodily with the drum and axle stub when the axle stub is displaced within the bearing slot 18. Electrical power for the motors 20 may be provided by a diesel generator unit or other prime mover (not shown) carried on the apparatus 10.

A double-acting hydraulic cylinder 21 having a piston rod 22 is secured to the lower cross member 12. The end of the piston rod 22 is provided with a sleeve bearing 23 engaging the lower axle stub 16. A like hydraulic cylinder assembly is provided on the upper cross member or top plate 13 for engagement with the upper axle stub 17.

The drum 14 may have any suitable diameter, preferably in the range of 3 feet to 6 feet, and may be of any practical desired length, preferably in the range of 6 feet to 15 feet. The drum is provided with a series of shearing or impact projections, here shown as teeth 24 and indicated in phantom outline. A detailed disclosure of the teeth 24 appears in FIGS. 5–7 of the drawings.

Although the projections have been illustrated as teeth 24, any other suitable form of impact or shredding or shearing or piercing projection may be utilized, for example hammers, flails, chains or knives, either fixed or pivoted. The character of the waste material being processed, the desired nature and particle size of the fragmentation, and other factors will influence and determine the particular type of projection 24 which is most suitable for the purpose intended. The spacing between the adjacent drums 14 will also depend upon various factors such as those just enumerated, but for purposes of illustration it may be assumed that the drums are spaced horizontally from each other a sufficient distance to provide a clearance space of approximately 6 inches between the ends of the projections 24. It will be understood that the location of the projections on each of a pair of drums 14 may be so arranged that the projections on one of the drums 14 have non-interfering orbital paths of movement in relation to the projections on the other of the drums 14, so that the drums can be spaced sufficiently close to each other to accomplish an inter-meshing or inter-leaving of the moving projections 24.

During the operation of the apparatus 10, whether it be mobile or stationary, the operational spacing between the drums 14 can be established by means of the hydraulic cylinder control. If the minimum spacing between the drums 14, as designed into the apparatus, does not provide enough clearance between the respective sets of revolving projections 24 for the particular operating condition which is encountered, the operator of the apparatus actuates the hydraulic cylinders 21 to project the pistons 22 to cause horizontal displacement of the drums 14 in the bearing slots 18, so as to create a wider spacing or separation between the pair of drums 14. The desired spacing thus established is then maintained during the normal operation of the apparatus.

If the solid waste material being treated includes an exceptionally large obstruction or other very dense mass which could prove injurious to the apparatus, the operator of the apparatus, upon becoming aware of the obstruction, can temporarily actuate the hydraulic cylinders 21 to extend or project the piston rods 22 to their maximum and thus create the fullest possible transverse displacement of the drums 14 from each other to create a clearance space between the drums adequate to pass the obstructing mass without injury to the apparatus. After the obstruction has passed through the clearance space thus provided, the operator can restore the spacing of the drums to their previously established operating positions by actuating the hydraulic cylinders to cause retraction of the piston rods 22 to the desired extent.

In order that the fragmentized material which is discharged from the apparatus 10 be confined and directed in a controlled discharge pattern, it may be desirable that the side walls 11 of the apparatus be bent or inclined toward each other in a convergent relationship, as indicated on the drawings. Furthermore, in order to reduce the particle velocity of the discharged material it may also be desirable to provide some form of baffle, such as chains or a safety screen 25 across all or part of the discharge throat 26 of the apparatus.

The fragmentizing action is accomplished by the shearing and piercing and impact of the rapidly revolving projections upon the waste material which is fed to the apparatus. Additionally, there is a secondary fragmentizing action resulting from the interaction between the projections on one of the drums 14 with the projections on the other, as when material is caught by the projections 24 on one drum and propelled into the path of movement of the projections on the other drum. A secondary fragmentization effect also occurs as the material engaged by the projections 24 is propelled and impacts upon the side walls 11 of the apparatus. Due to the relatively high speed of the drums 14 in which the projections 24 may have a peripheral speed on the order of 5000 feet per minute, a large amount of air is drawn into the apparatus and thoroughly mixed with the waste material as it is being fragmentized. This intimate intermix of the oxygen-containing air with the waste material serves to accelerate the decomposition and composting process of the discharged material.

Although I have indicated that the lower and upper cross members 12 and 13 do not fully enclose the top and bottom of the apparatus, it will be understood that, if desired, either or both of these cross members may be made larger so that the lower cross member 12 becomes the floor plate of the apparatus and the upper member 13 becomes the roof or top plate of the apparatus.

In order to protect the electrical motors 20 from debris, a heavy metal shield 27 is fastened to the forward edge of the upper cross member 13 and extends upwardly into the superstructure of the apparatus. For the same reason, a ramp or scoop 28 extends forwardly and downwardly from the lower cross member 12 and acts as a protective shield for the exposed mechanism on the underside of the cross member 12. However, the ramp or scoop 28 also serves to engage and elevate the waste material into the path of movement of the rotating drums 14.

As previously indicated, the fragmentized solid waste material can be deposited in windrows for further composting or can be discharged into a land fill or can be discharged into a digester or incinerator, as desired. Whatever the nature of the ultimate disposition or subsequent processing of the waste material, the fragmentized character of the waste material expedites such further processing and the particulate nature of the fragmentized waste material provides opportunities for efficient compacting and thus consequent space-saving in land fill or other similar operations Ordinarily, the rotation of the pair of drums 14 will be toward each other as viewed from the front position of FIG. 1, so that the left hand drum 14 of FIG. 2 will be rotated in a counter-clockwise direction while the right hand drum 14 will be rotated in a clockwise direction. However, there may be circumstances where it is desirable to have the direction of rotation of the respective drums 14 reversed or perhaps the direction of rotation of only one of them reversed, and accordingly my invention is not limited to any given direction of rotation of the drums 14. It may be noted however that the utilization of the electrical motors 20 provides a versatile and convenient means for controlling the direction of rotation as well as speed of rotation of each drum 14 independently of the other.

Although I have described a hydraulically actuated adjustable spacing and separating means for the drums 14, I intend this to be illustrative only of one form of mechanism for accomplishing this purpose. It will be understood that other mechanical, electrical, pneumatic or hydraulic arrangements may and can be utilized to perform the desired displacing function of the drums 14.

Figure 4:
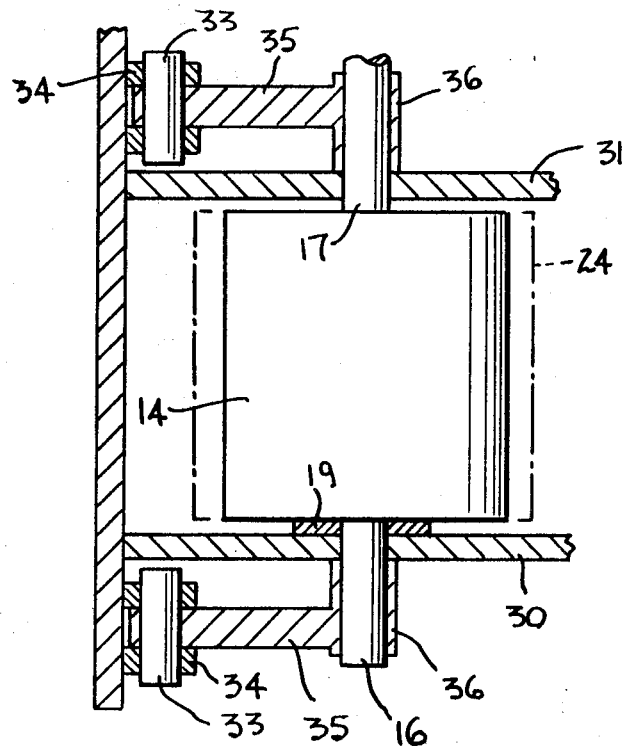
FIG. 4 is a fragmentary cross-sectional view, taken as indicated on line 4—4 of FIG. 3.

Referring now to FIGS. 3 and 4 of the drawings, I have shown a modified form of the invention in which the fragmentizing drums are disposed in staggered relationship to each other, instead of being in horizontal alignment, as illustrated in FIG. 2 of the drawings, previously described. FIGS. 3 and 4 of the drawings also show a form of load-responsive spacing or separation control for the drums or for a single drum.

The modified from of fragmentizing apparatus, indicated generally by the reference numeral 29, includes the previously described side walls 11 interconnected by a lower cross member or floor plate 30 and an upper cross member or top plate 31 which are vertically spaced from each other to accommodate the drums 14. The drums 14 are journalled in the upper and lower cross members by means of the axle stubs 16 and 17 in the manner previously described.

An arcuately extending elongated bearing slot 32 is provided in the upper and lower cross members 30 and 31 for the journalling of one of the drums 14. The radius of the bearing slot 32 is centered on the axis of a pivot pin 33 which is mounted in a support bracket 34 affixed to the adjacent side wall 11. The pin 33 serves to pivotally secure one end of a swing arm 35 whose other end is provided with a sleeve bearing 36 in engagement with the projecting axle stub 16 or 17 as the case may be. An expansion coil spring 37 has one end thereof secured to the side wall 11, as by bracket 38, and its other end is secured as at 39 to the swing arm 35 so as to yieldably maintain the swing arm and its attached drum 14 in the forwardmost position in the bearing slot 32.

When another drum 14 is used in conjunction with the previously described drum 14, the second drum may be journalled for rotation in circular openings 40 in the upper and lower cross member 30 and 31, as illustrated, so that its axis of rotation is fixed. However, if desired, the second drum 14 may be journalled for swinging movement in the same manner described above.

Instead of being in horizontal alignment, as in the embodiment of FIG. 2, the second drum 14 of FIG. 3 is disposed forwardly of the swinging drum 14 and its axis of rotation is spaced horizontally from the axis of rotation of the swinging drum 14 by a distance less than the diameter of the drums, so that an overlapping effect of the operative position of the drums is achieved.

During the operation of the apparatus, the swing-mounted drum 14 will yield and increasingly separate from its proximity to the fixed drum 14 in response to the density characteristics of the solid waste material being fed to the drums. If the solid waste material is of relatively high density and is being fed rapidly to the drums, the swinging drum will be displaced rearwardly and sideways to increase the clearance space between the drums if the drums become heavily burdened or loaded. If a large obstruction is encountered, the swinging drum 14 will similarly yield to permit the obstruction to pass and the spring will then return the drum to its operating position.

Figure 5:
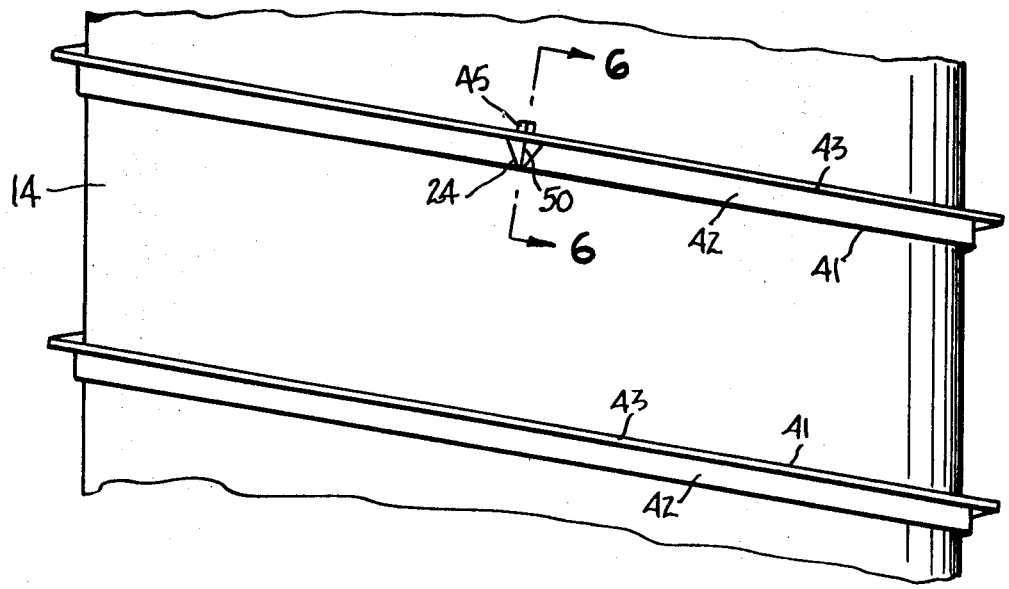
FIG. 5 is a fragmentary view in elevation of a portion of the drum showing the improved mounting means for the impact projections.
Figure 6:
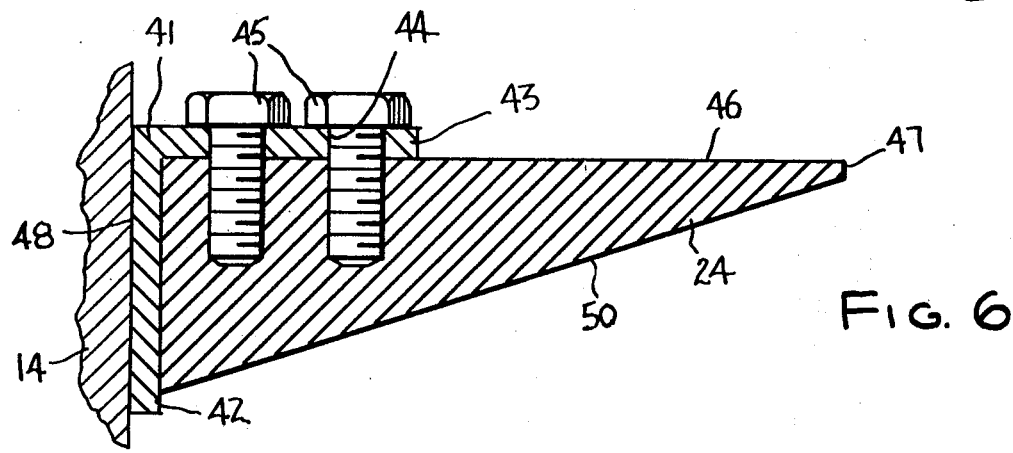
FIG. 6 is an enlarged fragmentary cross-sectional view, taken as indicated on line 6—6 of FIG. 5.
Figure 7:
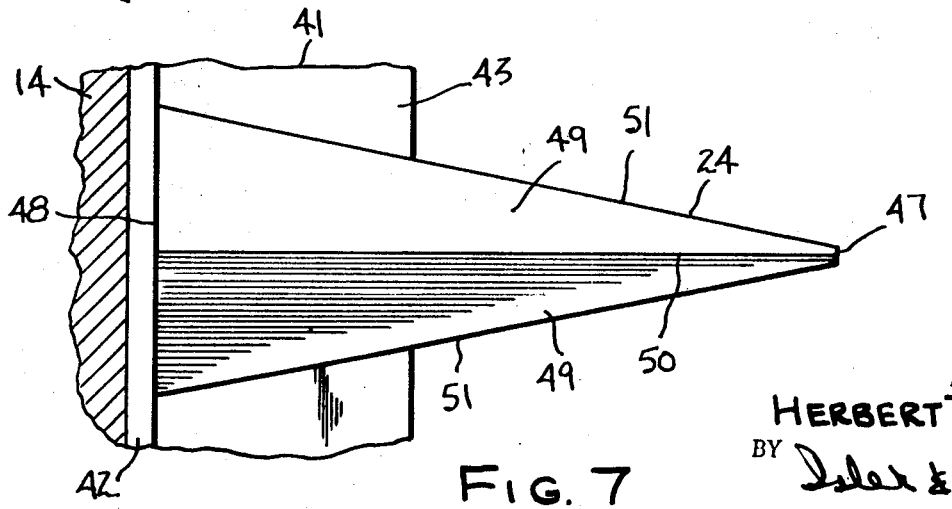
FIG. 7 is a plan view of the underside of the mounted tooth which is illustrated in FIG. 6.

FIGS. 5-7 of the drawings illustrate a preferred form of mounting for the projections or teeth 24 of the drum to facilitate repair of replacement. Due to the hard usage to which the apparatus is subjected in solid waste disposal operations, there is considerable wear on the teeth as well as occasional breakage or severe deformation of the teeth. In order to conveniently and quickly remove the teeth or other projections for purposes of replacement or resurfacing, I have provided an angle iron mounting bracket 41, one of whose legs 42, conveniently referred to as the base leg, is wrapped around the body of the drum 14 is conformity with the contour or periphery thereof and affixed thereto. Preferably, relatively short sections of the angle iron 41 are used, so that if several contiguous teeth or projections 24 are to be replaced, the whole section 41 containing such projections can be bodily removed and replaced without disturbing the remaining angle iron mounting brackets.

The other leg 43 of the angle iron mounting bracket, conveniently referred to as the support leg, lies normal to the base leg 42. The projection or tooth 24 is secured to the mounting bracket 41 in the desired spaced arrangement. Although the teeth 24 can be welded to the bracket 41, it is preferable that the teeth be detachably secured for individual quick replacement. To this end, the support leg 43 of the mounting bracket is provided with spaced apertures 44 to provide clearance openings for the traversal of cap screws 45 which threadedly engage the tooth 24 and rigidly secure it in abutment with the internal surfaces of both the legs 42 and 43.

As here shown, the tooth 24 has a relatively planar or flat upper surface 46 which is of a triangular configuration, being wide at its base and tapering uniformly to a point 47 at its free end. The intersecting base surface 48 of the tooth is flat and abuts the interior face of the base leg 42. Thus the surfaces 46 and 48 intersect to form a square corner conforming to the internal corner defined by the legs of the mounting bracket 41. The abutment of these surfaces with their respective portions of the mounting bracket serves to stabilize and support the tooth against movement or displacement when it is subjected to the impact strains during operation. By releasing the securing cap screws 45, any injured or badly deformed tooth can readily be removed and replaced quickly and conveniently, without disturbing the remaining teeth.

The side surfaces 49 of the tooth 24 converge toward each other to a knife edge 50, as well as forming shearing or knife edges 51 where they intersect the upper surface 46. The side surfaces 49 are of triangular configuration so that the common knife edge 50 tapers relatively to the upper surface 46 to a juncture at the common point 47. Thus the described tooth 24 provides three impact surfaces consisting of the upper surface 46 and the two side surfaces 49, and includes three shearing or knife edges, consisting of the knife edge 50 and the two knife edges 51, and has the piercing point 47. Thus, regardless of the direction of rotation of the drum 14, the tooth 24 will present impact surfaces and knife edges to the incoming solid waste material so that fragmentization can be accomplished.

As indicated in FIG. 5 of the drawings, the several sections of the angle iron mounting bracket 41 are preferably disposed in a serpentine or helix pattern around the drum so that there is an uninterrupted continuity of direction to the mounting bracket and to the teeth supported thereon. However, where such continuity of direction of the mounting bracket is not required or desired, the sections of the mounting bracket can be affixed to the drum in any desired pattern. It is however desirable that all the sections of the mounting bracket be uniform so that prefabricated replacement sections can be inserted, when required, without the necessity of giving consideration to size, spacing or arrangement.

In addition to providing a convenient and versatile mounting means for the teeth 24, the angle iron mounting bracket 41 also serves as a reinforcing rib for the surface of the drum 14 to give it additional rigidity and strength during its operation.

Although the mounting bracket 41 has been described in association with a particular form of tooth 24, it is to be understood that the basic advantages and versatility of this form of projection mounting bracket can also be utilized with other forms of impact or shearing projections 24.

I have described a fragmentizing apparatus having a pair of drums or rotors disposed in either horizontally aligned or staggered relationship and have indicated that a single such rotor may also be utilized, if necessary or desirable. It will also be apparent that more than two rotors may also be utilized, for example, an additional rotor in the staggered relationship of FIG. 3, or a total of four rotors combining the aligned and staggered pairs in one unit. It is also to be understood that my invention does not preclude the use of accessory devices, such as pick-up reels, leveling bars or the like, in conjunction with the apparatus described. Other known accessories such as side wings or guides and an elevated hood extending above and forward of the rotors for guiding the material into the rotors, is also contemplated.

The rotors are driven by any suitable means and can be displaced from each other either under operator control or by load-responsive means, to provide adjustable spacing and clearance between adjacent rotors or successive sets of rotors.

The adjustability of spacing has an important function in providing clearance for obstructions as well as for the actual processing function in shredding, fragmentizing and/or aerating the material for composting, digestion, compacting, landfill, incineration, baling, volume reduction for transport and hauling, or other end use, either in the form of a soil conditioner and/or plant nutrient or other saleable product or simply for expedient and sanitary disposal.

The adjustability of spacing can also be utilized, particularly in multiple sets of rotors, to initially accommodate the fragmentizing and composting apparatus to the width of the mass of incoming material and successively confine it and direct it into deposits or windrows of desired width and height.

Having thus described my invention, I claim:

1. In a composting and fragmentizing apparatus for waste material, the combination of a frame having vertically-spaced upper and lower cross-members, a power-driven rotor, means mounting said rotor in a forward portion of said frame between said cross-members for axial rotation about a substantially vertical axis, said frame providing horizontally-unobstructed access to the forward portion of said rotor throughout its vertical span, fragmentizing projections carried by said rotor, means for effecting relative horizontal movement between said frame and a mass of waste material forward thereof, means responsive to such movement for elevating said waste material above said lower cross-member and into the path of movement of said projections, converging impact walls disposed in the path of discharge movement of said material for effecting secondary impact fragmentation thereof, and a material-discharge passageway provided by said frame rearwardly of said rotor.

2. A combination as defined in claim 1; including a second rotor, fragmentizing projections carried by said second rotor, said second rotor being mounted for axial rotation about a substantially vertical axis for coaction with said first-named rotor.

3. A combination as defined in claim 1, including movable means for adjustably displacing the axis of rotation of said rotor toward or away from said impact walls.

4. A combination as defined in claim 3, wherein said movable means are hydraulically actuated.

5. A combination as defined in claim 3, including an axle provided on said rotor and a guide track for retaining said axle, and wherein said movable means comprises an actuating arm connected to said axle for effecting horizontal displacement thereof within said guide track.

6. A combination as defined in claim 5, wherein said track defines a linear movement of said axle.

7. A combination as defined in claim 5, wherein said track defines an arcuate movement of said axle.

8. A combination as defined in claim 5, wherein said actuating arm is spring-loaded to yieldably maintain said rotor in one limit of position defined by said track.

9. A combination as defined in claim 3, wherein said movable means comprises an actuating arm connected to said rotor and including load-responsive means associated with said actuating arm for effecting rotor-displacing actuation thereof.

10. In a composting and fragmentizing apparatus for waste material, the combination of a frame having vertically-spaced upper and lower cross-members, a plurality of power-driven rotors, means mounting each of said rotors between said cross-members for axial rotation about a substantially vertical axis, said frame providing horizontally-unobstructed access to the forward portion of at least one of said rotors throughout its vertical span, fragmentizing projections carried by said rotors in coacting relationship with each other, means for effecting relative horizontal movement between said frame and a mass of waste material forward thereof, means responsive to such movement for elevating said waste material above said lower cross-member and into the path of movement of said fragmentizing projections, converging impact members disposed in the path of discharge movement of said material for effecting secondary impact fragmentation and a material-discharge passageway provided by said frame rearwardly of said rotors.

11. A combination as defined in claim 10, wherein the axes of rotation of said rotors are disposed in horizontally aligned relationship.

12. A combination as defined in claim 10, including means for adjustably spacing the axis of rotation of one rotor relatively to the axis of rotation of another rotor.

13. A combination as defined in claim 10, including load-responsive means for effecting separating displacement of one rotor relatively to another rotor.

References Cited
UNITED STATES PATENTS

| | | | |
|---|---|---|---|
| 25,371 | 9/1859 | Scoville | 241—229 |
| 211,179 | 1/1879 | Peters | 241—229 |
| 2,762,410 | 9/1956 | Stahl | 241—230X |
| 2,781,915 | 2/1957 | Wormser | 241—229X |
| 3,160,352 | 12/1964 | Mollring | 241—275X |
| 3,208,678 | 9/1965 | Pick | 241—232X |
| 3,315,902 | 4/1967 | Pollitz | 241—231 |

JOHN E. MURTAGH, Primary Examiner

U.S. Cl. X.R.

241—229, 230, 259; 259—6, 183